US000001391H

United States Statutory Invention Registration [19]

[11] Reg. Number: H1391

Bloom, Jr. et al.

[43] Published: Jan. 3, 1995

[54] HYDRAULIC CONNECTION DEVICE

[75] Inventors: John J. Bloom, Jr., St. Charles, Mo.; Leslie H. Maas, Hampshire, Ill.

[73] Assignee: Caterpillar Inc.

[21] Appl. No.: 130,924

[22] Filed: Oct. 4, 1993

[51] Int. Cl.[6] ..... F16K 35/00

[52] U.S. Cl. ..... 251/89.5; 251/148; 137/887

[58] Field of Search ..... 251/149.9, 89.5, 148; 137/861, 887

[56] References Cited

U.S. PATENT DOCUMENTS

| | | | |
|---|---|---|---|
| 2,080,485 | 5/1937 | Johsen | 251/89.5 X |
| 2,236,104 | 3/1941 | McIntosh | 251/89.5 X |
| 2,404,996 | 7/1946 | Thrush | 251/148 |
| 4,887,644 | 12/1989 | Jeromson et al. | 251/148 X |
| 4,982,929 | 1/1991 | Spurling | 251/89.5 X |

*Primary Examiner*—David H. Brown
*Assistant Examiner*—Kevin L. Lee
*Attorney, Agent, or Firm*—Calvin E. Glastetter

[57] ABSTRACT

A valve assembly is useful for providing ports for connecting hydraulic circuits when the need arises. When an auxiliary circuit is being connected to the valve assembly, the circuit already connected may develop a differential fluid pressure drop. The subject valve assembly includes an inlet, a first outlet and a second outlet. A shut-off valve is positioned between the inlet and the first outlet. The shut-off valve must be in the closed position before the auxiliary circuit can be connected to the second outlet of the valve assembly. The shut-off valve includes a handle having an extending portion which overlies the second outlet when the shut-off valve is in the open position thus preventing the connection of circuit to the second outlet. This arrangement of components prevents connecting the auxiliary circuit to the valve assembly when the shut-off valve is in the open position.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HYDRAULIC CONNECTION DEVICE

DESCRIPTION

1. Technical Field

This invention relates to a hydraulic system for operating implements of a vehicle and more particularly to a valve having an outlet which is partially covered by a control handle when the valve is in the open position.

2. Background Art

In use of the hydraulic system a manifold is used to provide an outlet for connecting an auxiliary circuit when needed. The manifold has an inlet for receiving fluid from a pressure source. The manifold includes an outlet connected to a first circuit. The manifold further includes a second outlet having a quick connect coupler for connecting an auxiliary circuit when needed. One of the problems associated with the manifold is that there was not a way to prevent connecting the auxiliary circuit to the manifold when the second circuit was open and allowing fluid flow from the first outlet.

The present invention is directed to overcoming the problem as set forth above.

DISCLOSURE OF THE INVENTION

In one aspect of the present invention a hydraulic system for controlling the implements of a vehicle includes a valve assembly having an inlet. The valve assembly also includes a first outlet for connecting a first circuit and a second outlet for connecting an auxiliary circuit. A valve body includes a shut-off valve which is positioned between the inlet and the first outlet. The shut-off valve has a first position which allows fluid to flow to the first circuit. The shut-off valve has a second position which prevents fluid flow out of the first circuit when connecting the auxiliary circuit to the valve body. A handle is attached to the shut-off valve. The handle includes an extending portion which overlies the second outlet when the shut-off valve is in the first position.

The present invention provides an arrangement which prevents the connection of the auxiliary circuit to the valve body when the shut-off valve is in the first position.

BEST MODE FOR CARRYING OUT THE INVENTION

Figure 1:
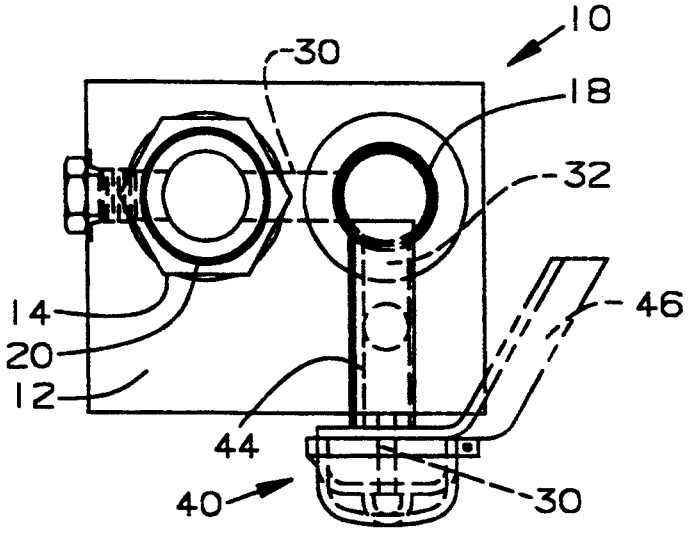
FIG. 1, is a plan view of the valve of the present invention.
Figure 2:
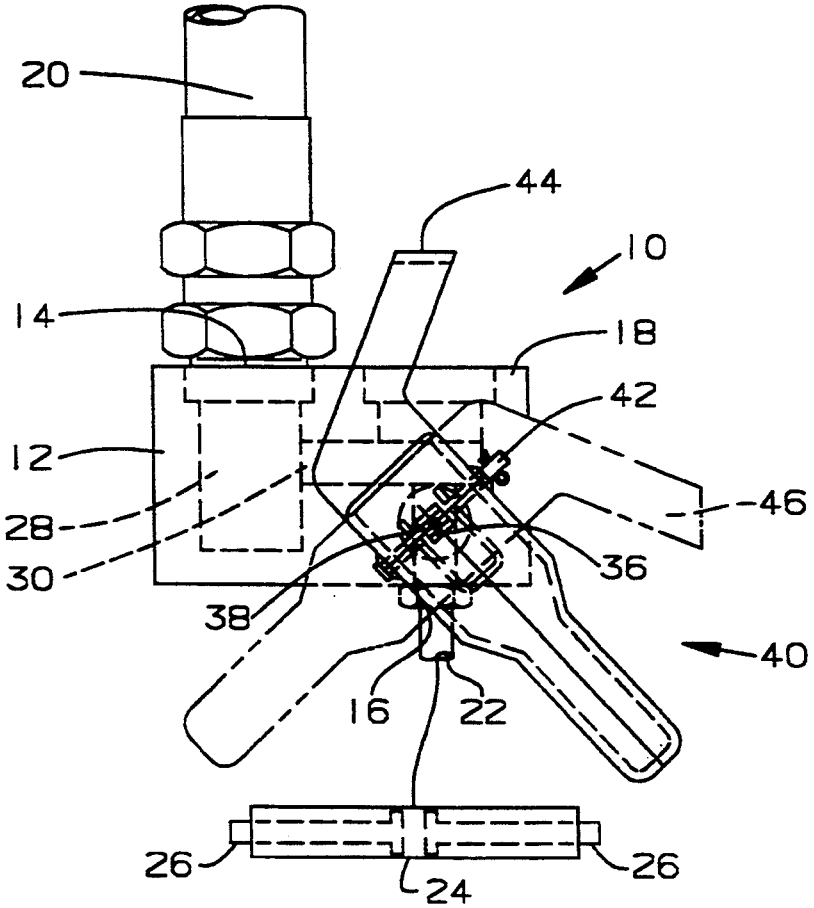
FIG. 2, is a side view of the valve.
Figure 3:
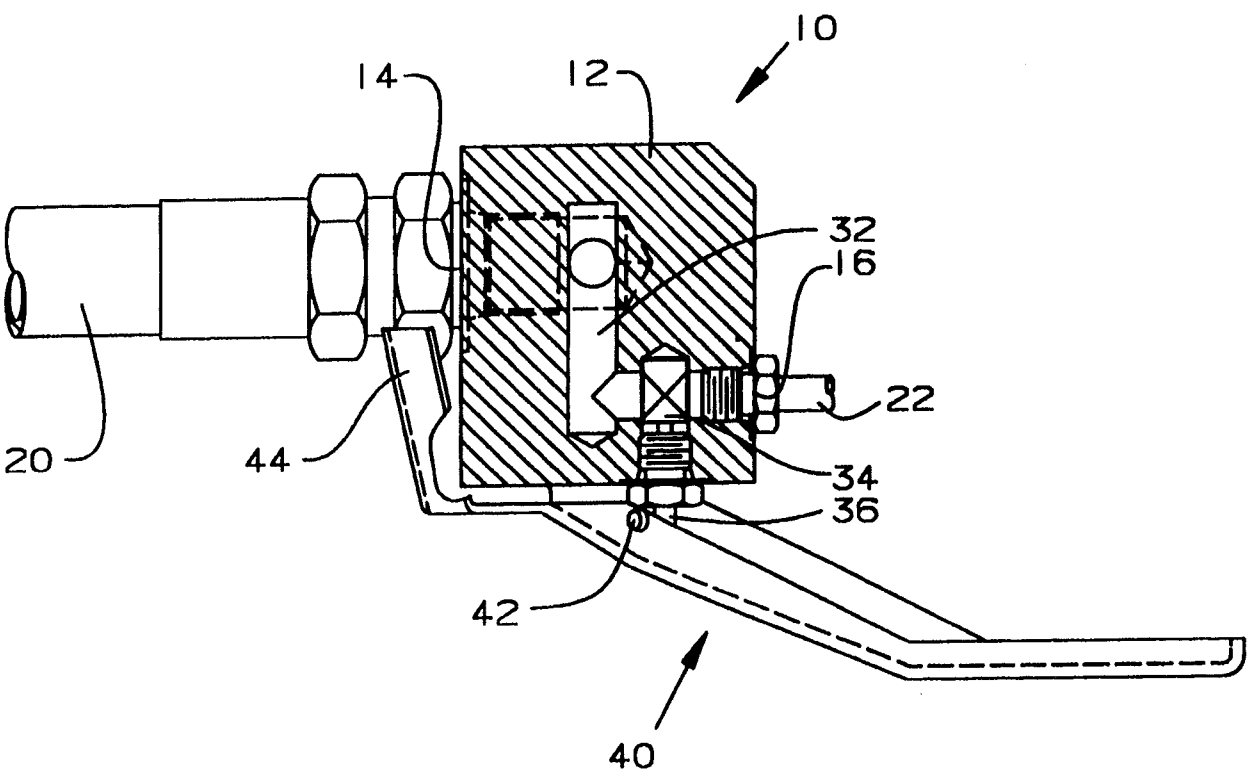
FIG. 3, is a sectional view of the valve.

Referring to the drawings, a valve arrangement 10 is used to connect an auxiliary circuit when needed. The valve arrangement 10 includes a valve body 12 having an inlet 14, a first outlet 16 and a second outlet 18. The second outlet 18 includes a quick disconnect coupling, of known construction, which stops the fluid flow from the outlet 18 when an auxiliary outlet line is not positioned in the outlet 18. An inlet line 20 is threadably connected in the inlet 14. The inlet line 20 is connected to a pressure source (not shown) and delivers pressurized fluid from the pressure source to the inlet 14. An outlet line 22 is threadably connected in the first outlet 16. The outlet line 22 delivers fluid from the first outlet 16 of the valve body 12 to a hydraulic cylinder 24. The hydraulic cylinder 24 controls a pair of locking pins 26 of a implement quick coupler arrangement (not shown). The valve body 12 has an inlet bore 28 for receiving fluid for distribution to the first and second outlets 16, 18. A first passage 30 connects the inlet bore 28 to the second outlet 18. A second passage 32 connects the first passage 30 to the first outlet 16. A conventional shut-off valve 34 is positioned within the second passage 32. The shut-off valve 34 includes an extending stem portion 36 having a hole 38 therethrough. The shut-off valve 34 is in a first position when the valve is open and in a second position when the valve is closed. A handle assembly 40 is attached to the stem portion 36 of the shut-off valve 34. A mounting pin 42 is attached to the handle assembly 40 and passes through the hole 38 of the stem portion 36. The handle assembly 40 includes an extending portion 44 which overlies the second outlet 18 when the shut-off valve 34 is in the first position. The extending portion 44 is moved away from the outlet 18, as shown in phantom lines 46, when the shut-off valve 34 is in the second position thus allowing the auxiliary line to be connected into the second outlet.

Industrial Applicability

In the use of the present invention, the valve arrangement 10 is used to distribute fluid from the pressure source to the first and second outlets 16,18. The fluid enters the inlet 14 and inlet bore 28 and moves through the first passage 30 to the second outlet 18. The fluid moves through the second passage 32 to the first outlet 16. As the fluid moves through the second passage 32 it must pass through the shut-off valve 34. The shut-off valve 34 has a first position which allows fluid to flow from the inlet 14 to the first outlet 16 and a second position which blocks fluid flow from the hydraulic cylinder 24 and line 22 into the valve body 12. Blocking the reverse flow of fluid will prevent differential fluid pressure in the line 22 and the hydraulic cylinder 24 from causing unintentional disengagement of the quick coupler locking pins 26. The shut-off valve 34 includes the handle assembly 40 which has the extending portion 44. The extending portion 44 overlies the second outlet 18 when the shut-off valve 34 is in the open position. The overlying position of the extending portion 44 will prevent connecting the auxiliary circuit to the valve body 12. When the auxiliary circuit is needed the handle assembly 40 must be rotated to close the shut-off valve 34. Rotation of the handle assembly 40 will move the extending portion 44 and uncover the second outlet 18 and allow the auxiliary circuit to be connected to the valve body 12.

In view of the foregoing, it is readily apparent that the structure of the present invention provides a valve arrangement which prevents the attachment of an auxiliary circuit when the shut-off valve is in the open position.

Other aspects, objects and advantages of the invention can be obtained from a study of the drawings, the disclosure and the appended claims.

We claim:

1. A hydraulic system for controlling the implements of a vehicle, the hydraulic system includes a valve assembly having an inlet, a first outlet for connecting a first circuit and a second outlet adapted for connecting a second circuit, comprising:

a valve body having a shut-off valve positioned between the inlet and the first outlet, the shut-off valve having a first position to allow fluid to flow from the inlet to the first outlet and a second position to prevent fluid flow from the first circuit when the second circuit is being connected to the second outlet, and a handle attached to the shut-off valve, the handle includes an extending portion which overlies the second outlet when the shut-off valve is in the first position.

* * * * *